US011098141B2

(12) United States Patent
Wang et al.

(10) Patent No.: US 11,098,141 B2
(45) Date of Patent: Aug. 24, 2021

(54) ARTICLES WITH IMPROVED OPTICAL PROPERTIES

(71) Applicant: BOREALIS AG, Vienna (AT)

(72) Inventors: Jingbo Wang, Linz (AT); Markus Gahleitner, Neuhofen/Krems (AT); Katja Klimke, Abu Dhabi (AE); Juliane Braun, Linz (AT); Pauli Leskinen, Helsinki (FI)

(73) Assignee: BOREALIS AG, Vienna (AT)

( * ) Notice: Subject to any disclaimer, the term of this patent is extended or adjusted under 35 U.S.C. 154(b) by 101 days.

(21) Appl. No.: 16/063,572

(22) PCT Filed: Dec. 19, 2016

(86) PCT No.: PCT/EP2016/081635
§ 371 (c)(1),
(2) Date: Jun. 18, 2018

(87) PCT Pub. No.: WO2017/108644
PCT Pub. Date: Jun. 29, 2017

(65) Prior Publication Data
US 2018/0371126 A1 Dec. 27, 2018

(30) Foreign Application Priority Data
Dec. 21, 2015 (EP) .................... 15201634

(51) Int. Cl.
C08F 110/06 (2006.01)
C08L 23/14 (2006.01)
C08K 5/00 (2006.01)
C08F 4/649 (2006.01)
C08F 4/643 (2006.01)
C08F 2/00 (2006.01)

(52) U.S. Cl.
CPC ............ C08F 110/06 (2013.01); C08F 2/001 (2013.01); C08F 4/6435 (2013.01); C08F 4/6494 (2013.01); C08K 5/0083 (2013.01); C08L 23/14 (2013.01); C08F 2500/12 (2013.01); C08L 2201/10 (2013.01); C08L 2203/10 (2013.01); C08L 2205/025 (2013.01); C08L 2205/24 (2013.01); C08L 2308/00 (2013.01); C08L 2314/02 (2013.01)

(58) Field of Classification Search
CPC .... C08F 110/06; C08F 4/6435; C08F 4/6494; C08L 23/14; C08K 5/0083
See application file for complete search history.

(56) References Cited

U.S. PATENT DOCUMENTS 6,410,662 B1 * 6/2002 Ushioda ................. C08F 10/00
502/152
8,378,045 B2 2/2013 Kaarto et al.
2005/0203264 A1 9/2005 Musgrave et al.
2007/0296120 A1* 12/2007 Wolfschwenger ...... C08L 23/10
264/328.1
2014/0357815 A1* 12/2014 Denkwitz ............. C08F 110/06
526/123.1

FOREIGN PATENT DOCUMENTS

| CN | 103517924 A | 1/2014 | |
|---|---|---|---|
| EP | D316187 A2 | 3/1990 | |
| EP | D887379 B1 | 12/1998 | |
| EP | 1514893 A1 | 3/2005 | |
| EP | 1801155 A1 | 6/2007 | |
| EP | 1857475 A1 | 11/2007 | |
| EP | 2610270 B1 | 7/2013 | |
| EP | 2610271 B1 | 7/2013 | |
| EP | 2610272 B1 | 7/2013 | |
| EP | 2719725 A1 | 4/2014 | |
| EP | 3221112 | 9/2017 | |
| WO | 1992/12182 A1 | 7/1992 | |
| WO | 1999007747 A1 | 2/1999 | |
| WO | 1999/24478 A1 | 5/1999 | |
| WO | 1999/24479 A1 | 5/1999 | |
| WO | 00/68315 A1 | 11/2000 | |
| WO | 2004/000899 A1 | 12/2003 | |
| WO | 2004029112 A1 | 4/2004 | |
| WO | 2004/055101 A1 | 7/2004 | |
| WO | 2004/111095 A1 | 12/2004 | |
| WO | 2006/065799 A2 | 6/2006 | |
| WO | 2007-017360 A | 2/2007 | |
| WO | 2011/163032 A1 | 12/2011 | |
| WO | 2012/007430 A1 | 1/2012 | |
| WO | 2014/187687 A1 | 11/2014 | |
| WO | WO-2014187686 A1 * | 11/2014 | .............. C08F 10/06 |
| WO | 2015075054 A1 | 5/2015 | |
| WO | 20150785088 A1 | 5/2015 | |

OTHER PUBLICATIONS

"Thin Wall Plastic Injection Molded Packaging," EVCO Plastics (2019). (Year: 2019).*
Chinese office action for patent Application No. 201680073856.9, dated Apr. 1, 2019.
Partial European Search Report dated Jul. 13, 2016.
Extended European Search Report dated Oct. 27, 2016.
Cecchin,et al. "Polyproperie Product Innovation by Reactor Granule Technology" Macromol. Symp. 173, 195-209 (2001).
Botkin, et al. "Improving Molding Productivity and Enhancing Mechanical Properties of Polypropylene with Nucleating Agents" Proceedings of the SPE Automotive TPO Global Conference, Dearborn, MI, 2002.
Technical Data Sheet "DuPure U 76 Polypropylene Homopolymer" Apr. 2015.
EP Grounds of Opposition as Filed.
(Continued)

Primary Examiner — Catherine S Branch
(74) Attorney, Agent, or Firm — Tarolli, Sundheim, Covell & Tummino LLP

(57) ABSTRACT

Moulded articles comprising a polypropylene homopolymer with rather high melt flow rate, high stiffness, improved optical properties and an advantageous balance between stiffness and optical properties.

8 Claims, No Drawings

(56) References Cited

OTHER PUBLICATIONS

Nucleators and Clarifiers for Polypropylene NA-11/NA-21/NA-71/NA-90X/NA-806A, Amfine Chemical Co.
Barczewski, et al. "Influence of heterogeneous nucleation on thermodynamic properties of isotactic polypropylene" Polish Journal of Chemical Technology, 15, 4, 71-74, 2013.
Bajgur, et al. "The evolution of new generation 'single-site' Ziegler-Natta polymerization catalysts" Special Section: Organometallic Chemistry, Current Science, vol. 78, No. 11, Jun. 10, 2000.
Opposition against European Patent No. EP 3 184 449 B1 filed Aug. 3, 2020.
ASTM D642-15 "Standard Test Method for Determining Compressive Resistance of Shipping Containers, Components, and Unit Loads" 2013.
Sherman, "New Clarifiers & Nucleators: They Make Polypropylene Run Clearer and Faster" Mar. 30, 2004.
Definition of Such As by Merriam-Webster, https://www.dicitionary.com/browse/such--as?s=t, accessed on Mar. 10, 2020.
Santis, et al. "Optical Properties of Polypropylene upon Recycling", The Scientific World Journal, Oct. 2013.
Pasquini, "Polypropylene Handbook, 2nd Edition" 2005.
Tang "Millad 3988 & NX8000, Physical Property Comparison in Homopolymer and Random Copolymer Resins" TSR# 012008172.
Technical datasheet for Millad 3988 "Millad Clarifying Agents" published Feb. 1999.
Material Nonlinearity, https://wiki.csiamerica.com/display/kb/Material+nonlinearity, accessed on Mar. 16, 2020.
Krager-Kocsis "Polypropylene: an A-Z Reference" ISBN 978-94-010-5899-5, DOI 103.1007/978-94-011-4421-6, 1999.
Technical Data Sheet "Millad NX8000: The New Standard in Clear Polypropylene", 2010.
Seymour/Carraher's "Polymer Chemistry: Sixth Edition Revised and Expanded" 2003.
International Standard, ISO 1873-2 Third Edition "Plasitcs—Polypropylene (PP) moulding and extrusion materials" Sep. 1, 2007.
Gahleitner, et al., "Heterophasic Copolymers of Polypropylene: Development, Design Principles, and Future Challenges" Journal of Applied Polymer Science 2013.
EP Notice of Opposition for EP 3 184 449 B1, Aug. 6, 2020.
Tolinski, "Additives for Polyolefins: Getting the Most Out of Polypropylene, Polyethylene and TPO Second Edition" 2015.
Zhang "Comparison of Nucleation Effects of Organic Phosphorous and Sorbitol Derivative Nucleating Agents in Isotactic Polypropylene" Journal of Macromolecular Science, Part B: Physics, 47: 1188-1196, 2008.
Wkipedia, entry "Ziegler-Natta catalyst", https://en.wikipedia.org/wiki/Ziegler-Natta_catalyst, accessed on Sep. 2, 2019.
Wkipedia, entry "Sodium benzoate", https://en.wikipedia.org/wiki/Sodium_benzoate, accessed on Mar. 19, 2020.
Markus Galhleitner, et al.; "Influence of Nucleants on the Formation of Shear-Induced Structures in Polypropylene"; Macromol. Symp. 185, 77-87 (2002).
Markus Galhleitner, et al.; "Polypropylene"; Ullmann's Encyclopedia of Industrial Chemistry; VCH 2014; p. 25.

Declaration of Markus Gahleitner regarding inventive example 1E1 of WO 2017/178046 table 2 of the patent; 2 pgs.
Declaration of Markus Gahleitner regarding the commercial grades used in the example section of EP 2 371 517 A1; 1 pg.
Declaration of Markus Gahleitner regarding table 2 of the patent; 1 pg.
Declaration of Markus Gahleitner regarding the impossibility to measure melt strength of polypropylene having high melt flow rate MFR2; 2 pg.
Declaration of Markus Gahleitner regarding the measurement of HDT according to ISO and ASTM method; 2 pg.
Applicant: Borealis AG; European Patent Application No. EP15201634.1; Office Communication dated Dec. 28, 2020; 25 pgs.
EP Notice of Opposition for EP 3 184 449 B1, Feb. 23, 2021.
Fabricio M. Silva, et al.; "Synthesis of Propylene/1-Butene Copolymers in Gas-Phase Process with MgCl2-Supported Ziegler-Natta Catalyst"; Anais do 8 Congresso Brasileiro de Polimeros; 3 pgs.
Fred W. Billmeyer; "Measurement of Optical Clarity by Low-Angle Light Scattering"; Journal of the Optical Society of America vol. 49, Issue 4, (1959); 2 pgs.; https://doi.org/10.1364/JOSA.49.000368.
Y. Minami, et al..; "Development of low isotactic polyolefin"; Polymer Journal (2015) 47, 227-234.
A. Thakur et al., "Development of Large-Scale Stopped-Flow Technique and its Application in Elucidation of Initial Ziegler-Natta Olefin Polymerization Kinetics"; Polymers Jun. 7, 2019; 22 pgs.
Warmeformbeständigkeitstemperatur UL, https://www.ulttc.com/de/leistungen/pruefverfahren/waermeformbestaendigkeit/waermeformbestaendigkeitstemperatur.html, accessed on Jan. 29, 2021; 3 pgs.
Haze & Reflectance Meter HR-100, Murakami Color Research Laboratory, https://www.mcrl.co.jp/english/products/p_haze/detail/HR100.html, accessed on Jan. 29, 2021, and pdf-file; "1 Description for JIS K 7105, JIS K 7361 and JIS K 7136"; downloaded on Jan. 29, 2021; 4 pogs.
ASTM D642, version of Apr. 2015.
Definition of Such As by Merriam-Webster.
Millad 3988 and NX8000 presentation by Milliken & Company, 2008.
"New Clarifiers and nucleators", published Mar. 2004.
Clive Maier, et al., "Polypropylene the Defensive User's Guide and Databook"; 1998, pp. 7-9.
Clive Maier, et al., "Polypropylene the Defensive User's Guide and Databook"; 1998, pp. 147-148.
Clive Maier, et al., "Polypropylene the Defensive User's Guide and Databook"; 1998, p. 208.
N. Pasquini, "Polypropylene Handbook", 2005, p. 112-113.
N. Pasquini, "Polypropylene Handbook", 2005, p. XV.
N. Pasquini, "Polypropylene Handbook", 2005, pp. 409-413.
Priority document 9-218756 of D63 (WO 99/07747).
Translation of paragraphs [0063] to [0071] of D64).
Antti Tynys, et al.; "quantitative 13C NMR Analysis of Isotactic Ethylene-Propylene Copolymers Prepared with Matallocene Catalyst: Effect of ethylene on Polymerization Mechanisms"; Macromolecules 2012,45, 7704-7710).
Declaration of Markus Gahleitner regarding the properties of the examples of the patent.
ASTM ASTM D648, p. 3.
Declaration of Markus Gahleitner regarding the catalyst used in CE1 of the patent.

* cited by examiner

ARTICLES WITH IMPROVED OPTICAL PROPERTIES

The present invention relates to injection moulded articles comprising a polypropylene homopolymer with rather high melt flow rate, high stiffness, improved optical properties and an advantageous balance between stiffness and optical properties.

In the field of thin-wall packaging of the moulding market it is of great importance to have a material of high flowability with good mechanical properties, i.e. stiffness and good optical properties. Good flowability is needed for achieving a good processability in various manufacturing methods of articles, such as injection moulding processes, thereby allowing the production of articles having low wall thicknesses and/or long flow paths in the mould.

The mechanical properties are also critical in view of the thin-walled articles. Particularly, in the field of containers there is a need to have a material sufficiently stiff to be stacked. Good stiffness of the material is also desired for reducing wall-thickness of the final articles and hence saving raw-material, while maintaining impact properties at the same time.

Further, materials should also withstand mechanical compression damage, which is frequently incurred by e.g. dropping the articles.

At the same time it is a constant desire to provide materials with low haze and hence better see-through-properties on the content of the article.

Therefore, it is a constant need for polypropylene homopolymer to balance the conflicting requirements of good processability, stiffness, and good optical performance, i.e. low haze.

DESCRIPTION OF THE PRIOR ART

Polypropylene compositions are known in the art. The European patent application EP1514893A1, for example, discloses polypropylene compositions comprising a clarifier selected from one or more phosphate-based α-nucleating agents and/or polymeric nucleating agents, selected from the group consisting of vinylcycloalkane polymers and vinylalkane polymers. Similar nucleating agents are also disclosed in the international applications WO 99/24478 and WO 99/24479. The European patent application EP316187A2 discloses a crystalline polypropylene homopolymer incorporated therein a polymer of a vinyl cycloalkane. The international application WO2004/055101 discloses a heterophasic propylene copolymer, containing nucleating agents, selected from phosphate-derived nucleating agents, sorbitol-derived nucleating agents, metal salts of aromatic or aliphatic carboxylic acids as nucleating agents, polymeric nucleating agents, such as polyvinyl cyclohexane and inorganic nucleating agents, such as talc.

EP1801155A1 refers to a polypropylene composition comprising a nucleated propylene homopolymer having improved optical properties, especially on injection moulded articles.

However, the patent requires very high loadings of polymeric nucleating agents to improve optical properties.

All polypropylene compositions mentioned above are produced using a Ziegler-Natta catalyst, in particular a high yield Ziegler-Natta catalyst (so called fourth and fifth generation type to differentiate from low yield, so called second generation Ziegler-Natta catalysts), which comprises a catalyst component, a co-catalyst component and an internal donor based on phthalate-compositions.

WO2012007430 is one example of a limited number of patent applications, describing phthalate free catalysts based on citraconate as internal donor.

However, up to now the mechanical properties of polypropylenes produced with catalyst having citraconate compositions as internal donors, did not fulfill all the desired requirements, especially in view of stiffness/optical properties.

Still there is a constant need for polypropylene homopolymers and articles made thereof, which provide good flowability, i.e. a high melt flow rate, improved stiffness and better transparency, while maintaining impact behaviour at a satisfying level.

Hence, it is an object of the present invention to provide a material with good flowability, i.e. a high melt flow rate, improved stiffness and better transparency, while maintaining impact behaviour.

It is a further object of the present invention to provide articles with an improved balance of said properties.

Seen from another point of view, the current invention provides articles with improved Top Load and haze while maintaining drop height behaviour unchanged.

OBJECT OF THE INVENTION

It has now surprisingly been found that the above object can be achieved by moulded articles characterized by comprising a polypropylene homopolymer, wherein the polypropylene homopolymer is polymerised in the presence of a Ziegler-Natta catalyst (ZN-C) and further characterised in that the polypropylene homopolymer a. comprises 0-1.0 wt % of ethylene and/or a C4-C10 α-olefin determined according to $^{13}$C-NMR,
b. comprises at least one α-nucleating agent
c. is free of phthalic acid esters as well as their respective decomposition products and
d. has a MFR230/2.16 determined according to ISO1133 in the range of 20-200 g/10 min, and has
e. a haze of ≤45% when measured according to ASTM D1003 on 1 mm plaques.

In a special embodiment the inventors also identified a method to improve Heat distortion Temperature and/or optical properties such as haze in polypropylene homopolymers. In a further special embodiment the invention concerns the use of the articles in household applications or packaging applications.

DETAILED DESCRIPTION

The polypropylene homopolymer in accordance with the present invention may have a melt flow rate (MFR$_2$) as measured in accordance with ISO 1133 at 230° C. and 2.16 kg load of at least 20 g/10 min, such 30 g/10 min or 38 g/10 min or more. Preferably the polypropylene homopolymer may have a melt flow rate MFR$_2$ of at least 45 g/10 min, like 52 g/10 min, or at least 58 or 62 g/10 min.

The polypropylene homopolymer in accordance with the present invention may have a melt flow rate (MFR$_2$) of up to 200 g/10 min, such as up to 180 g/10 min, 150 g/10 min or below or 120 g/10 min or below.

Further preferred is that the polypropylene homopolymer of present invention is in the range of 20-200 g/10 min, preferably in the range of 38 to 180 g/10 min, like in the range of 52 to 150 g/10 min. Even more preferably the MFR$_2$ is in the range of 58-120 g/10 min.

It is within the scope of the invention that the MFR of the polypropylene homopolymer can be achieved either directly in the reactor or during a post-polymerisation visbreaking step using peroxides, wherein the peroxidic visbreaking is preferred.

The modality with respect to molecular weight distribution and thus with respect to melt flow ratio is not critical.

Thus the polypropylene composition in accordance with the present invention may be unimodal or multimodal including bimodal with respect to molecular weight distribution.

The polypropylene homopolymer according to the present invention relates to a polypropylene homopolymer that consists substantially, i.e. of at least 99.0 wt.-%, more preferably of at least 99.3 wt.-%, still more preferably of at least 99.6 wt.-%, like of at least 99.8 wt.-% or at least 99.9 wt.-%, of propylene units. In another embodiment only propylene units are detectable, i.e. only propylene has been polymerised.

The comonomers units other than propylene are selected from ethylene and C4 to C10 α-olefins, like butene or hexene. Preferably, the comonomer is ethylene.

The total comonomer content of the nucleated propylene composition may be in the range of up to 1.0 wt. %, like up to 0.7 wt. %, such as up to 0.4 wt. % preferably in the range of 0.2-1.0 wt. %, like in the range of 0.4 to 0.7 wt. %.

Alternatively preferred are polypropylene homopolymers with a comonomer content of 0-0.40 wt %. Further preferred are polypropylene homopolymers a comonomer content of >0.40-0.90 wt %. In a preferred embodiment the polypropylene homopolymer according to the present invention consists of propylene as sole monomer.

The polypropylene homopolymer in accordance with the present invention may be further characterized by low haze ≤45% when measured according to ASTM 1003 on 1 mm plaques, such as ≤42%, ≤40%, ≤35%, ≤32%, or ≤29%.

The polypropylene homopolymer in accordance with the present invention may be further characterized by and Heat distortion Temperature HDT, determined according to ISO75B of at least 95° C., preferably at least 99° C., such as 105° C. or 110° C. or 115° C. or above.

Especially preferred are polypropylene homopolymers with a comonomer content of 0-0.40 wt % and a haze value of ≤45% or a HDT, determined according to ISO75B of at least 95° C.

Equally preferred are polypropylene homopolymers with a comonomer content of >0.40-0.90 wt % and a haze value of ≤45% and/or a HDT, determined according to ISO75B of at least 100° C. and/or a Top Load of ≥360 N.

The polypropylene homopolymer according to the present invention may have a Flexural Modulus determined according to ISO178 of 1700 MPa or higher, such as 1740 MPa or higher.

Nucleating Agents

The α-nucleating agent according the present invention may be selected from the group consisting of:
(i) salts of monocarboxylic acids and polycarboxylic acids, e.g. sodium benzoate or aluminum tert-butylbenzoate;
(ii) soluble nucleating agents, like sorbitol derivatives, e.g. di(alkylbenzylidene)sorbitols as 1,3:2,4- dibenzylidene sorbitol, 1,3:2,4-di(4-methylbenzylidene) sorbitol, 1,3:2,4-di(4-ethylbenzylidene) sorbitol and 1,3:2,4-Bis(3,4-dimethylbenzylidene) sorbitol, as well as nonitol derivatives, e.g. 1,2,3-trideoxy-4,6;5,7-bis-O-[(4-propylphenyl)methylene] nonitol, and benzenetrisamides like substituted 1,3,5-benzenetrisamides as N,N',N''-tris-tert-butyl-1,3,5-benzenetricarboxamide, N,N',N''-tris-cyclohexyl-1,3,5-benzene-tricarboxamide and N-[3,5-bis-(2,2-dimethyl-propionylamino)-phenyl]-2,2-dimethyl-propionamide, wherein 1,3:2,4-di(4-methylbenzylidene) sorbitol and N-[3,5-bis-(2,2-dimethyl-propionylamino)-phenyl]-2,2-dimethyl-propionamide are equally preferred,
(iii) salts of diesters of phosphoric acid, e.g. sodium 2,2'-methylenebis (4,6-di-tert-butylphenyl) phosphate or aluminium-hydroxy-bis[2,2'-methylene-bis(4,6-di-t-butylphenyl)phosphate], and hydroxybis (2,4,8,10-tetra-tert-butyl-6-hydroxy-12Hdibenzo(d,g)(1,3,2) dioxaphosphocin 6-oxidato) aluminium, wherein hydroxybis (2,4,8,10-tetratert-butyl-6-hydroxy-12H-dibenzo(d,g)(1,3,2) dioxaphosphocin 6-oxidato) aluminium is preferred; and
(iv) polymeric nucleating agents, such as polymerized vinyl compounds, in particular vinyl cycloalkanes, like vinyl cyclohexane (VCH), poly(vinyl cyclohexane) (PVCH), vinylcyclopentane, and vinyl-2-methyl cyclohexane, 3-methyl-1-butene, 3-ethyl-1-hexene, 3-methyl-1-pentene, 4-methyl-1-pentene or mixtures thereof. PVCH is a particularly preferred.

It is especially preferred that the nucleating agent comprised in the polypropylene homopolymer of the present invention is selected from the group of soluble nucleating agents (ii) or from the group of polymeric nucleating agents (iv) of above list.

In a specific embodiment the polypropylene homopolymer comprises at least two, such as exactly two nucleating agents. These two (or more) nucleating agents are preferably selected from group (ii) for the one and from group (iv) for the other.

Polymeric nucleating agents from group (iv) can either be incorporated by in-reactor nucleation or by the so called Masterbatch technology (compounding technology) as mentioned below. In a preferred embodiment of the present invention, the polymeric nucleating agent is introduced into the heterophasic polypropylene composition by means of a suitably modified catalyst, into the reactor (i.e. in-reactor nucleation) i.e. the catalyst to be used in catalysing the polymerization of any of the fractions a) or b), preferably a) is subjected to a polymerization of a suitable monomer for the polymeric nucleating agent to produce first said polymeric nucleating agent. The catalyst is then introduced together with the obtained polymeric nucleating agent to the actual polymerization step of the propylene polymer component(s).

In a particularly preferred embodiment of the present invention, the propylene polymer is prepared in the presence of such a modified catalyst to obtain said reactor made polypropylene homopolymer. With such modified catalyst, it is also possible to carry out the above-identified preferred polymerization sequence for the preparation of in-situ blended multimodal, including bimodal, polypropylenes.

The polymeric nucleating agent introduced via in-reactor-nucleation usually is present in the final product in an amount of from at least 10 ppm, typically at least 13 ppm, (based on the weight of the polypropylene homopolymer). Preferably this agent is present in the polypropylene homopolymer in a range of from 10 to 1000 ppm, more preferably from 15 to 500 ppm, such as 20 to 100 ppm.

In case of applying in-reactor nucleation, the inventive composition comprises a propylene homopolymer fraction received from a step of pre-polymerization which is carried out before the polymerization of the first fraction as defined above. More preferably, said fraction is a propylene homopolymer fraction.

The polymeric nucleating agent may also be present in the final product also in lower concentrations, like in an amount of from at least 0.5 ppm, typically at least 1.0 ppm, (based on the weight of the polypropylene homopolymer). Preferably this agent is present in the polypropylene homopolymer in a range of 2 to 100 ppm, more preferably from 3 to 80 ppm, such as 5 to 50 ppm.

Another embodiment, different to the above mentioned in-reactor blend, is a mechanical blend of a polymer with a nucleating agent, wherein the polymer is first produced in the absence of a polymeric nucleating agent and is then blended mechanically with the polymeric nucleating agent or with a small amount of nucleated polymer or with polymers, which already contain the polymeric nucleating agent (so-called master batch technology) in order to introduce the polymeric nucleating agent into the polymer mixture. The preparation of a reactor made polymer composition ensures the preparation of a homogenous mixture of the components, for example a homogenously distributed polymeric nucleating agent in the polypropylene homopolymer, even at high concentrations of polymer nucleating agent.

As outlined above, the reactor made polymer composition is a preferred embodiment of the present invention, although also mechanical blends prepared, for example, by using master batch technology are envisaged by the present invention.

Preparation Process:

The polypropylene composition in accordance with the present invention may be prepared by any suitable polymerisation process.

In a preferred embodiment of the present invention, the polymeric nucleating agent is introduced into the polypropylene composition by means of a suitably modified catalyst, i.e. the catalyst to be used in catalysing the polymerisation of the propylene polymer is subjected to a polymerisation of a suitable monomer for the polymeric nucleating agent to produce first said polymeric nucleating agent (so called BNT-technology is mentioned below). The catalyst is then introduced together with the obtained polymeric nucleating agent to the actual polymerisation step of the propylene polymer component(s).

In a particularly preferred embodiment of the present invention, the propylene polymer is prepared in the presence of such a modified catalyst to obtain said reactor made polypropylene composition.

The polypropylene homopolymer according to the invention is preferably prepared by a sequential polymerisation process, as described below, in the presence of a catalyst system comprising a Ziegler-Natta Catalyst, a cocatalyst and optionally an external donor, as described below.

In the pre-polymerisation reactor a polypropylene is produced. The pre-polymerisation is conducted in the presence of the Ziegler-Natta catalyst. According to this embodiment the Ziegler-Natta catalyst, the co-catalyst, and the external donor are all introduced to the pre-polymerisation step. However, this shall not exclude the option that at a later stage for instance further co-catalyst and/or external donor is added in the polymerisation process, for instance in the first reactor. In one embodiment the Ziegler-Natta catalyst, the co-catalyst, and the external donor are only added in the pre-polymerisation reactor.

The pre-polymerisation reaction is typically conducted at a temperature of 0 to 60° C., preferably from 15 to 50° C., and more preferably from 20 to 45° C.

The pressure in the pre-polymerisation reactor is not critical but must be sufficiently high to maintain the reaction mixture in liquid phase. Thus, the pressure may be from 20 to 100 bar, for example 30 to 70 bar.

In a preferred embodiment, the pre-polymerisation is conducted as bulk slurry polymerisation in liquid propylene, i.e. the liquid phase mainly comprises propylene, with optionally inert components dissolved therein. Furthermore, according to the present invention, an ethylene feed can be employed during pre-polymerisation as mentioned above.

It is possible to add other components also to the pre-polymerisation stage. Thus, hydrogen may be added into the pre-polymerisation stage to control the molecular weight of the polypropylene as is known in the art. Further, antistatic additive may be used to prevent the particles from adhering to each other or to the walls of the reactor.

The precise control of the pre-polymerisation conditions and reaction parameters is within the skill of the art.

Due to the above defined process conditions in the pre-polymerisation, a mixture of the Ziegler-Natta catalyst and the polypropylene produced in the pre-polymerisation reactor (PR) is obtained. Preferably the Ziegler-Natta catalyst is (finely) dispersed in the polypropylene. In other words, the Ziegler-Natta catalyst particles introduced in the pre-polymerisation reactor (PR) split into smaller fragments which are evenly distributed within the growing polypropylene. The sizes of the introduced Ziegler-Natta catalyst particles as well as of the obtained fragments are not of essential relevance for the instant invention and within the skilled knowledge.

Polymerisation Process

Accordingly, the polypropylene homopolymer is preferably produced in a process comprising the following steps under the conditions set out above:

a) In the pre-polymerisation, a mixture of the Ziegler-Natta catalyst and the polypropylene produced in the pre-polymerisation reactor is obtained. Preferably the Ziegler-Natta catalyst is (finely) dispersed in the polypropylene. Subsequent to the pre-polymerisation, the mixture of the Ziegler-Natta catalyst and the polypropylene produced in the pre-polymerisation reactor is transferred to the first reactor. Typically the total amount of the polypropylene (coming from the prepolymerisation) in the final propylene polymer is rather low and typically not more than 5.0 wt.-%, more preferably not more than 4.0 wt.-%, still more preferably in the range of 0.5 to 4.0 wt.-%, like in the range 1.0 of to 3.0 wt.-%.

b) In the first polymerisation reactor, i.e. in a loop reactor, propylene is polymerised obtaining a first propylene homopolymer fraction of the propylene homopolymer, transferring said first propylene homopolymer fraction to any optional further polymerisation reactors.

In any further optional reactor propylene is polymerised in the presence of any precedingly produced polypropylene fraction Within the invention it is envisaged, that comonomers may be applied in any of the polymerisation reactors.

A preferred multistage process is a "loop-gas phase"-process, such as developed by Borealis A/S, Denmark (known as BORSTAR® technology) is described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Catalyst System

A possible catalyst for being used in the production of the polypropylene homopolymer is described herein:

The catalyst is a solid Ziegler-Natta catalyst (ZN-C), which comprises compounds (TC) of a transition metal of Group 4 to 6 of IUPAC, like titanium, a Group 2 metal compound (MC), like a magnesium, and an internal donor (ID) being a non-phthalic compound, preferably a non-phthalic acid ester, still more preferably being a diester of non-phthalic dicarboxylic acids as described in more detail below. Thus, the catalyst is in a preferred embodiment fully free of undesired phthalic compounds. Further, the solid catalyst is free of any external support material, like silica or $MgCl_2$, but the catalyst is self-supported.

The Ziegler-Natta catalyst can be further defined by the way as obtained. Accordingly, the Ziegler-Natta catalyst is preferably obtained by a process comprising the steps of
a)
- $a_1$) providing a solution of at least a Group 2 metal alkoxy compound (Ax) being the reaction product of a Group 2 metal compound (MC) and a monohydric alcohol (A) comprising in addition to the hydroxyl moiety at least one ether moiety optionally in an organic liquid reaction medium; or
- $a_2$) a solution of at least a Group 2 metal alkoxy compound (Ax') being the reaction product of a Group 2 metal compound (MC) and an alcohol mixture of the monohydric alcohol (A) and a monohydric alcohol (B) of formula ROH, optionally in an organic liquid reaction medium; or
- $a_3$) providing a solution of a mixture of the Group 2 alkoxy compound (Ax) and a Group 2 metal alkoxy compound (Bx) being the reaction product of a Group 2 metal compound (MC) and the monohydric alcohol (B), optionally in an organic liquid reaction medium; or
- $a_4$) providing a solution of Group 2 alkoxide of formula $M(OR_1)_n(OR_2)_m X_{2-n-m}$, or mixture of Group 2 alkoxides $M(OR_1)_n X_{2-n'}$ and $M(OR_2)_m X_{2-m'}$, where M is Group 2 metal, X is halogen, $R_1$ and $R_2$ are different alkyl groups of $C_2$ to $C_{16}$ carbon atoms, and $0 \leq n < 2$, $0 \leq m < 2$ and $n+m+(2-n-m)=2$, provided that both n and $m \neq 0$, $0 < n' \leq 2$ and $0 < m' \leq 2$; and b) adding said solution from step a) to at least one compound (TC) of a transition metal of Group 4 to 6 and
c) obtaining the solid catalyst component particles,
and adding an internal electron donor (ID), preferably a non-phthalic internal donor (ID), at any step prior to step c).

The internal donor (ID) or precursor thereof is thus added preferably to the solution of step a) or to the transition metal compound before adding the solution of step a).

According to the procedure above the Ziegler-Natta catalyst (ZN-C) can be obtained via precipitation method or via emulsion-solidification method depending on the physical conditions, especially temperature used in steps b) and c). Emulsion is also called in this application liquid/liquid two-phase system.

In both methods (precipitation or emulsion-solidification) the catalyst chemistry is the same.

In precipitation method combination of the solution of step a) with at least one transition metal compound (TC) in step b) is carried out and the whole reaction mixture is kept at least at 50° C., more preferably in the temperature range of 55 to 110° C., more preferably in the range of 70 to 100° C., to secure full precipitation of the catalyst component in form of a solid particles (step c).

In emulsion-solidification method in step b) the solution of step a) is typically added to the at least one transition metal compound (TC) at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active catalyst composition. Solidification (step c) of the droplets is suitably carried out by heating the emulsion to a temperature of 70 to 150° C., preferably to 80 to 110° C.

The catalyst prepared by emulsion-solidification method is preferably used in the present invention.

In a preferred embodiment in step a) the solution of $a_2$) or $a_3$) are used, i.e. a solution of (Ax') or a solution of a mixture of (Ax) and (Bx), especially the solution of $a_2$).

Preferably the Group 2 metal (MC) is magnesium.

The magnesium alkoxy compounds as defined above can be prepared in situ in the first step of the catalyst preparation process, step a), by reacting the magnesium compound with the alcohol(s) as described above, or said magnesium alkoxy compounds can be separately prepared magnesium alkoxy compounds or they can be even commercially available as ready magnesium alkoxy compounds and used as such in the catalyst preparation process of the invention.

Illustrative examples of alcohols (A) are glycol monoethers. Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2-ethylhexyloxy)ethanol, 2-butyloxy ethanol, 2-hexyloxy ethanol and 1,3-propylene-glycol-monobutyl ether, 3-butoxy-2-propanol, with 2-(2-ethylhexyloxy)ethanol and 1,3-propylene-glycol-monobutyl ether, 3-butoxy-2-propanol being particularly preferred.

Illustrative monohydric alcohols (B) are of formula ROH, with R being straight-chain or branched $C_2$-$C_{16}$ alkyl residue, preferably $C_4$ to $C_{10}$, more preferably C6 to $C_8$ alkyl residue. The most preferred monohydric alcohol is 2-ethyl-1-hexanol or octanol.

Preferably a mixture of Mg alkoxy compounds (Ax) and (Bx) or mixture of alcohols (A) and (B), respectively, are used and employed in a mole ratio of Bx:Ax or B:A from 10:1 to 1:10, more preferably 6:1 to 1:6, most preferably 4.1 to 1:4.

Magnesium alkoxy compound may be a reaction product of alcohol(s), as defined above, and a magnesium compound selected from dialkyl magnesium, alkyl magnesium alkoxides, magnesium dialkoxides, alkoxy magnesium halides and alkyl magnesium halides. Further, magnesium dialkoxides, magnesium diaryloxides, magnesium aryloxyhalides, magnesium aryloxides and magnesium alkyl aryloxides can be used. Alkyl groups can be a similar or different $C_1$-$C_{20}$ alkyl, preferably $C_2$-$C_{10}$ alkyl. Typical alkyl-alkoxy magnesium compounds, when used, are ethyl magnesium butoxide, butyl magnesium pentoxide, octyl magnesium butoxide and octyl magnesium octoxide. Preferably the dialkyl magnesium are used. Most preferred dialkyl magnesium are butyl octyl magnesium or butyl ethyl magnesium.

It is also possible that magnesium compound can react in addition to the alcohol (A) and alcohol (B) also with a polyhydric alcohol (C) of formula $R''(OH)_m$ to obtain said magnesium alkoxide compounds. Preferred polyhydric alcohols, if used, are alcohols, wherein R'' is a straight-chain, cyclic or branched $C_2$ to $C_{10}$ hydrocarbon residue, and m is an integer of 2 to 6.

The magnesium alkoxy compounds of step a) are thus selected from the group consisting of magnesium dialkoxides, diaryloxy magnesium, alkyloxy magnesium halides, aryloxy magnesium halides, alkyl magnesium alkoxides, aryl magnesium alkoxides and alkyl magnesium aryloxides. In addition a mixture of magnesium dihalide and a magnesium dialkoxide can be used.

The solvents to be employed for the preparation of the present catalyst may be selected among aromatic and aliphatic straight chain, branched and cyclic hydrocarbons with 5 to 20 carbon atoms, more preferably 5 to 12 carbon atoms, or mixtures thereof. Suitable solvents include benzene, toluene, cumene, xylene, pentane, hexane, heptane, octane and nonane. Hexanes and pentanes are particular preferred.

The reaction for the preparation of the magnesium alkoxy compound may be carried out at a temperature of 40 to 70° C. Most suitable temperature is selected depending on the Mg compound and alcohol(s) used.

The transition metal compound of Group 4 to 6 is preferably a titanium compound, most preferably a titanium halide, like TiCl$_4$.

The internal donor (ID) used in the preparation of the catalyst used in the present invention is preferably selected from (di)esters of non-phthalic carboxylic (di)acids, 1,3-diethers, derivatives and mixtures thereof. Especially preferred donors are diesters of mono-unsaturated dicarboxylic acids, in particular esters belonging to a group comprising malonates, maleates, succinates, citraconates, glutarates, cyclohexene-1,2-dicarboxylates and benzoates, and any derivatives and/or mixtures thereof. Preferred examples are e.g. substituted maleates and citraconates, most preferably citraconates.

In emulsion method, the two phase liquid-liquid system may be formed by simple stirring and optionally adding (further) solvent(s) and additives, such as the turbulence minimizing agent (TMA) and/or the emulsifying agents and/or emulsion stabilizers, like surfactants, which are used in a manner known in the art for facilitating the formation of and/or stabilize the emulsion. Preferably, surfactants are acrylic or methacrylic polymers. Particular preferred are unbranched $C_{12}$ to $C_{20}$ (meth)acrylates such as poly(hexadecyl)-methacrylate and poly(octadecyl)-methacrylate and mixtures thereof. Turbulence minimizing agent (TMA), if used, is preferably selected from α-olefin polymers of α-olefin monomers with 6 to 20 carbon atoms, like polyoctene, polynonene, polydecene, polyundecene or polydodecene or mixtures thereof. Most preferable it is polydecene.

The solid particulate product obtained by precipitation or emulsion-solidification method may be washed at least once, preferably at least twice, most preferably at least three times with an aromatic and/or aliphatic hydrocarbons, preferably with toluene, heptane or pentane and or with TiCl$_4$. Washing solutions can also contain donors and/or compounds of Group 13, like trialkyl aluminum, halogenated alky aluminum compounds or alkoxy aluminum compounds. Aluminum compounds can also be added during the catalyst synthesis. The catalyst can further be dried, as by evaporation or flushing with nitrogen, or it can be slurried to an oily liquid without any drying step.

The finally obtained Ziegler-Natta catalyst is desirably in the form of particles having generally an average particle size range of 5 to 200 µm, preferably 10 to 100. Particles are compact with low porosity and have surface area below 20 g/m$^2$, more preferably below 10 g/m$^2$. Typically the amount of Ti is 1 to 6 wt-%, Mg 10 to 20 wt-% and donor 10 to 40 wt-% of the catalyst composition.

Detailed description of preparation of catalysts is disclosed in WO 2012/007430, EP2610271, EP 2610270 and EP2610272 which are incorporated here by reference.

The Ziegler-Natta catalyst (ZN-C) is preferably used in association with an alkyl aluminum cocatalyst and optionally external donors.

As further component in the instant polymerisation process an external donor (ED) is preferably present. Suitable external donors (ED) include certain silanes, ethers, esters, amines, ketones, heterocyclic compounds and blends of these. It is especially preferred to use a silane. It is most preferred to use silanes of the general formula

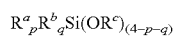

wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different. Specific examples of such silanes are (tert-butyl)$_2$Si(OCH$_3$)$_2$, (cyclohexyl)(methyl)Si(OCH$_3$)$^2$, (Phenyl)$_2$Si(OCH$_3$)$_2$ and (cyclopentyl)$_2$Si(OCH$_3$)$_2$, or of general formula

wherein $R^3$ and $R^4$ can be the same or different a represent a hydrocarbon group having 1 to 12 carbon atoms.

$R^3$ and $R^4$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^3$ and $R^4$ are independently selected from the group consisting of methyl, ethyl, n-propyl, n-butyl, octyl, decanyl, iso-propyl, iso-butyl, iso-pentyl, tert-butyl, tert-amyl, neopentyl, cyclopentyl, cyclohexyl, methylcyclopentyl and cycloheptyl.

More preferably both $R^1$ and $R^2$ are the same, yet more preferably both $R^3$ and $R^4$ are an ethyl group.

Especially preferred external donors (ED) are the pentyl dimethoxy silane donor (D-donor) or the cyclohexylmethyl dimethoxy silane donor (C-Donor).

In addition to the Ziegler-Natta catalyst (ZN-C) and the optional external donor (ED) a co-catalyst can be used. The co-catalyst is preferably a compound of group 13 of the periodic table (IUPAC), e.g. organo aluminum, such as an aluminum compound, like aluminum alkyl, aluminum halide or aluminum alkyl halide compound. Accordingly, in one specific embodiment the co-catalyst (Co) is a trialkylaluminium, like triethylaluminium (TEAL), dialkyl aluminium chloride or alkyl aluminium dichloride or mixtures thereof. In one specific embodiment the co-catalyst (Co) is triethylaluminium (TEAL).

Advantageously, the triethyl aluminium (TEAL) has a hydride content, expressed as AlH$_3$, of less than 1.0 wt % with respect to the triethyl aluminium (TEAL). More preferably, the hydride content is less than 0.5 wt %, and most preferably the hydride content is less than 0.1 wt %.

Preferably the ratio between the co-catalyst (Co) and the external donor (ED) [Co/ED] and/or the ratio between the co-catalyst (Co) and the transition metal (TM) [Co/TM] should be carefully chosen.

Accordingly, (a) the mole ratio of co-catalyst (Co) to external donor (ED) [Co/ED] must be in the range of 5 to 45, preferably is in the range of 5 to 35, more preferably is in the range of 5 to 25; and optionally (b) the mole ratio of co-catalyst (Co) to titanium compound (TC) [Co/TC] must be in the range of above 80 to 500, preferably is in the range of 100 to 350, still more preferably is in the range of 120 to 300.

As mentioned above the Ziegler-Natta catalyst (ZN-C) is preferably modified by the so called BNT-technology during the above described pre-polymerisation step in order to introduce the polymeric nucleating agent.

Such a polymeric nucleating agent is as described above a vinyl polymer, such as a vinyl polymer derived from monomers of the formula

wherein R1 and R2, together with the carbon atom they are attached to, form an optionally substituted saturated or unsaturated or aromatic ring or a fused ring system, wherein the ring or fused ring moiety contains four to 20 carbon atoms, preferably 5 to 12 membered saturated or unsaturated or aromatic ring or a fused ring system or independently represent a linear or branched C4-C30 alkane, C4-C20 cycloalkane or C4-C20 aromatic ring. Preferably R1 and R2, together with the C-atom wherein they are attached to, form a five- or six-membered saturated or unsaturated or aromatic ring or independently represent a lower alkyl group comprising from 1 to 4 carbon atoms. Preferred vinyl compounds for the preparation of a polymeric nucleating agent to be used in accordance with the present invention are in particular vinyl cycloalkanes, in particular vinyl cyclohexane (VCH), vinyl cyclopentane, and vinyl-2-methyl cyclohexane, 3-methyl-1-butene, 3-ethyl-1-hexene, 3-methyl-1-pentene, 4-methyl-1-pentene or mixtures thereof. VCH is a particularly preferred monomer.

The weight ratio of vinyl compound to polymerisation catalyst in the modification step of the polymerisation catalyst preferably is 0.3 or more up to 40, such as 0.4 to 20 or more preferably 0.5 to 15, like 0.5 to 2.0.

The polymerisation of the vinyl compound, e.g. VCH, can be done in any inert fluid that does not dissolve the polymer formed (e.g. polyVCH). It is important to make sure that the viscosity of the final catalyst/polymerised vinyl compound/inert fluid mixture is sufficiently high to prevent the catalyst particles from settling during storage and transport.

The adjustment of the viscosity of the mixture can be done either before or after the polymerisation of the vinyl compound. It is, e.g., possible to carry out the polymerisation in a low viscosity oil and after the polymerisation of the vinyl compound the viscosity can be adjusted by addition of a highly viscous substance. Such highly viscous substance can be a "wax", such as an oil or a mixture of an oil with a solid or highly viscous substance (oil-grease). The viscosity of such a viscous substance is usually 1,000 to 15,000 cP at room temperature. The advantage of using wax is that the catalyst storing and feeding into the process is improved. Since no washing, drying, sieving and transferring are needed, the catalyst activity is maintained.

The weight ratio between the oil and the solid or highly viscous polymer is preferably less than 5:1.

In addition to viscous substances, liquid hydrocarbons, such as isobutane, propane, pentane and hexane, can also be used as a medium in the modification step.

The polypropylenes produced with a catalyst modified with polymerised vinyl compounds contain essentially no free (unreacted) vinyl compounds. This means that the vinyl compounds shall be completely reacted in the catalyst modification step. To that end, the weight ratio of the (added) vinyl compound to the catalyst should be in the range of 0.05 to 10, preferably less than 3, more preferably about 0.1 to 2.0, and in particular about 0.1 to 1.5. It should be noted that no benefits are achieved by using vinyl compounds in excess.

Further, the reaction time of the catalyst modification by polymerisation of a vinyl compound should be sufficient to allow for complete reaction of the vinyl monomer, i.e. the polymerisation is continued until the amount of unreacted vinyl compounds in the reaction mixture (including the polymerisation medium and the reactants) is less than 0.5 wt-%, in particular less than 2000 ppm by weight (shown by analysis). Thus, when the prepolymerised catalyst contains a maximum of about 0.1 wt-% vinyl compound, the final vinyl compound content in the polypropylene will be below the limit of determination using the GC-MS method (<0.01 ppm by weight). Generally, when operating on an industrial scale, a polymerisation time of at least 30 minutes is required, preferably the polymerisation time is at least 1 hour and in particular at least 5 hours. Polymerisation times even in the range of 6 to 50 hours can be used. The modification can be done at temperatures of 10 to 70° C., preferably 35 to 65° C.

According to the invention, nucleated high-stiffness propylene polymers are obtained when the modification of the catalyst is carried out in the presence of strongly coordinating external donors.

General conditions for the modification of the catalyst are also disclosed in WO 00/6831, incorporated herein by reference with respect to the modification of the polymerisation catalyst. The preferred embodiments as described previously in the present application with respect to the vinyl compound also apply with respect to the polymerisation catalyst of the present invention and the preferred polypropylene composition in accordance with the present invention. Suitable media for the modification step include, in addition to oils, also aliphatic inert organic solvents with low viscosity, such as pentane and heptane. Furthermore, small amounts of hydrogen can be used during the modification.

Moulded Articles

As used herein the term "moulded article" is intended to encompass articles that are produced by any conventional moulding technique, e.g. injection moulding, blow moulding, stretch moulding, compression moulding, roto-moulding or injection stretch blow moulding. Preferably the moulded article is an article that is produced by injection moulding.

The moulded articles preferably are thin-walled articles having a wall thickness of 300 μm to 2 mm. More preferably the thin-walled articles have a wall thickness of 300 μm to 1400 μm, and even more preferably the thin-walled articles have a wall thickness of 300 μm to 900 μm.

The articles of the current invention can be containers, such as cups, crates, tubs, bins, boxes, buckets, beakers, bowls, trays, or parts of such articles, such as see-through-windows, lids, or the like.

The articles of the current invention can also be used in houseware applications, for e.g. cutlery or toys.

The articles are further useful for storage or for packaging applications.

The articles of the current invention can also be devices used in the medical industry, like syringes, testing tips, sample containers or the like.

The articles of the current invention are especially suitable for stackable applications like boxes, e.g. transport boxes, lidded pails or containers e.g. storage containers.

The articles of the current invention are characterized by an improved Top load, providing better stacking behavior. The topload, when measured on 850 ml-cups as described below, may be 360 N or higher, such as 370 N or higher.

The articles of the current invention are characterized by a drop height of 0.5 m or above.

The method for producing moulded articles with improved HDT as well as the method for producing moulded articles with improved optical properties such as haze, comprises the steps of
   a) polymerising propylene and optionally ethylene in the presence of a Ziegler-Natta catalyst, wherein the Ziegler-Natta-catalyst comprises
      i) compounds of a transition metal of Group 4 to 6 of IUPAC, ii) a Group 2 metal compound (MC) and
iii) an internal donor (ID), wherein said internal donor (ID) is a non-phthalic compound, preferably is a non-phthalic acid ester,
iv) a co-catalyst (Co), and
v) optionally an external donor (ED)
b) optionally incorporating at least one α-nucleating agent and
c) moulding articles comprising said polymer obtained in step i).

The α-nucleating agent incorporating in step b) is preferably a polymeric nucleating agent and/or a soluble nucleating agent.

In a preferred embodiment the invention encompasses a method for producing moulded articles improved haze or improved clarity.

In a preferred embodiment the invention encompasses a method for producing moulded articles with improved HDT and improved optical properties.

The present invention will now be described in further detail by the examples provided below.

EXAMPLES

Measuring Methods
Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The $MFR_2$ of polypropylene is determined at a temperature of 230° C. and a load of 2.16 kg.

Xylene Soluble Fraction and Amorphous Phase

The xylene soluble fraction (XCS) as defined and described in the present invention is determined as follows: 2.0 g of the polymer were dissolved in 250 ml p-xylene at 135° C. under agitation. After 30 minutes, the solution was allowed to cool for 15 minutes at ambient temperature and then allowed to settle for 30 minutes at 25±0.5° C. The solution was filtered with filter paper into two 100 ml flasks. The solution from the first 100 ml vessel was evaporated in nitrogen flow and the residue dried under vacuum at 90° C. until constant weight is reached. The xylene soluble fraction (percent) can then be determined as follows:

$$XCS\ \% = (100 \times m_1 \times v_0)/(m_0 \times v_1),$$

wherein $m_0$ designates the initial polymer amount (grams), $m_1$ defines the weight of residue (grams), $v_0$ defines the initial volume (millilitre) and $v_1$ defines the volume of the analysed sample (millilitre).

The fraction insoluble in p-xylene at 25° C. (XCU) is then equal to 100%−XCS %.

The solution from the second 100 ml flask was treated with 200 ml of acetone under vigorous stirring. The precipitate was filtered and dried in a vacuum oven at 90° C. This solution can be employed in order to determine the amorphous part (AM) of the polymer (wt %) using the following equation:

$$AM = (100 \times m_1 \times v_0)/(m_0 \times v_1)$$

wherein $m_0$ designates the initial polymer amount (g), $m_1$ defines the weight of residue (g), $v_0$ defines the initial volume (ml) and $v_1$ defines the volume of the analysed sample (ml).

Flexural Modulus

The Flexural Modulus is determined in 3-point-bending according to ISO 178 on injection moulded specimens of 80×10×4 $mm^3$ prepared in accordance with EN ISO 1873-2.

DSC Analysis, Melting Temperature (Tm) Crystallization Temperature (Tc)

DSC parameters are measured with a TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature and heat of crystallization (Hc) are determined from the cooling step, while melting temperature and heat of fusion (Hf) are determined from the second heating step.

Charpy Impact Test:

The Charpy notched impact strength (NIS) was measured according to ISO 179 1eA at +23° C., using injection moulded bar test specimens of 80×10×4 $mm^3$ prepared in accordance with EN ISO 1873-2

Heat Deflection Temperature (HDT)

HDT is measured on injection moulded test specimen as described in EN ISO 1873-2 (80×10×4 $mm^3$) that are placed in a heating bath, resting horizontally on two supports according to ISO75B. A constant load (0.45 MPa) is applied in the centre of the specimen (three-point bending) and the bath temperature is raised at a constant rate. The temperature of the bath at which the flexural deflection of the loading point has reached a predefined level is the heat deflection temperature of the material.

Haze and Clarity

Haze and Clarity are determined from 1 mm or 2 mm thick injection moulded plaque samples or on cups (as described below) according to ASTM D1003-A using a hazegard+hazemeter byk-gardner.

Cup Testing:
Preparation of 850 ml Cups

Cups are produced by injection moulding using an Engel speed 180 machine with a 35 mm barrier screw (supplied by Engel Austria GmbH). The melt temperature was adjusted to 245° C. and the mould temperature to 10° C.; an injection speed of 770 $cm^3$/s with an injection time of 0.08 s was used, followed by a holding pressure time of 0.1 s with 1300 bar (decreasing to 800 bar) and a cooling time of 1.5 s, giving a standard cycle time of 3.8 s. The dimensions of the cup are as follows: Height 100 mm, diameter top 115 mm, diameter bottom 95 mm, bottom wall thickness 0.44 mm, side-wall thickness 0.40 mm. For the cycle time optimization the machine was run with standard injection parameters first. The machine was run in full automatic mode, reducing the cooling time after a stabilization time of 5 minutes from 1.5 to 0.3 sec. Depending on the material behaviour the cups were then either deformed or could not get de-moulded. Then the cooling time was increased in steps of 0.1 s until the part quality was found to be optically and mechanically satisfactory. The cycle time resulting from this experiment can be found in table 3.

The Top load test was performed by compressing cups between two plates attached to a universal testing machine with a test speed of 10 mm/min according to an internal procedure in general agreement with ASTM D642. For testing, the cup is placed upside down (i.e. with the bottom facing the moving plate) into the test setup and compressed to the point of collapse which is noticed by a force drop on the force-deformation curve, for which the maximum force is noted. At least 8 cups are tested to determine an average result.

Drop Height

Cups are filled with water. The cups are lifted to a certain height and then dropped down. If they do not collapse, the height is increased. In case of a failure it will be decreased. Generally, the test can be divided into a pre- and a main test phase:

The pre-test phase is used to determine the starting height of the main test phase. 10 cups are needed for this test phase. In this test phase only 1 cup is tested for a selected drop height. The starting height in the pre-test phase is selected according to the material type and previous test results. In case of a cup failure, the drop height will be reduced by 10 cm. If the cup stands the test, the height is increased by 10 cm. If all the 10 cups are tested, the start height for the main test is set to the highest height of the pre-test which led to a non-failure of the cup.

During the main test, two cups are tested simultaneously at each height. The procedure of increasing/decreasing the test height is similar to the pre-test phase. The only add-on is, that if one cup stands and one fails at a certain drop height, the test height will stay constant. 20 cups are tested during the main test phase. The drop height is afterwards determined using the formula below:

$$\text{drop height} = \frac{\Sigma(\text{number of cups@certain height}) \times \text{height}}{\text{total number of tested cups}}$$

Haze Measurement on Cups

The measurement is done on the outer wall of the cups produced as described above. The top and bottom of the cups are cut off. The resulting round wall is then split in two, horizontally. Then from this wall six equal samples of app. 60×60 mm$^2$ are cut from close to the middle. The specimens are placed into the instrument with their convex side facing the haze port. Then the transparency, haze and clarity are measured for each of the six samples and the haze value is reported as the average of these six parallels.

Comonomer Content Quantification of Poly(Propylene-Co-Ethylene) Copolymers

Quantitative 13C{1H} NMR spectra were recorded in the solution-state using a Bruker Advance III 400 NMR spectrometer operating at 400.15 and 100.62 MHz for 1H and 13C respectively. All spectra were recorded using a 13C optimised 10 mm extended temperature probe head at 125° C. using nitrogen gas for all pneumatics. Approximately 200 mg of material was dissolved in 3 ml of 1,2-tetrachloroethane-d2 (TCE-d2) along with chromium-(III)-acetylacetonate (Cr(acac)3) resulting in a 65 mM solution of relaxation agent in solvent {8}. To ensure a homogeneous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme{3, 4}. A total of 6144 (6 k) transients were acquired per spectra.

Quantitative 13C{1H} NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed {7}.

The comonomer fraction was quantified using the method of Wang et. al. {6} through integration of multiple signals across the whole spectral region in the 13C{1H} spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et al. was modified to reduce the influence of non-zero integrals of sites that are known to not be present. This approach reduced the overestimation of ethylene content for such systems and was achieved by of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et al. {6}. Equations used for absolute propylene content were not modified.

The mole percent comonomer incorporation was calculated from the mole fraction:

$$E[\text{mol \%}]=100*fE$$

The weight percent comonomer incorporation was calculated from the mole fraction:

$$E[wt\%]=100*(fE*28.06)/((fE*28.06)+((1-fE)*42.08))$$

Within the term "polypropylene homopolymer" in the meaning of the present inventions, it is understood, that the composition still may comprise the usual additives for utilization with polyolefins, such as pigments (e.g. TiO2 or carbon black), stabilizers, acid scavengers and/or UV-stabilisers, lubricants, antistatic agents, further nucleating agents and utilization agents (such as processing aid agents, adhesive promotors, compatibiliser, etc.).

The amount of such additives usually is 10 wt % or less, preferably 5 wt % or less.

Material Description:

1a) Catalyst Preparation 3.4 litre of 2-ethylhexanol and 810 ml of propylene glycol butyl monoether (in a molar ratio 4/1) were added to a 20 l reactor. Then 7.8 litre of a 20% solution in toluene of BEM (butyl ethyl magnesium) provided by Crompton GmbH were slowly added to the well stirred alcohol mixture. During the addition the temperature was kept at 10° C. After addition the temperature of the reaction mixture was raised to 60° C. and mixing was continued at this temperature for 30 minutes. Finally after cooling to room temperature the obtained Mg-alkoxide was transferred to storage vessel.

21.2 g of Mg alkoxide prepared above was mixed with 4.0 ml bis(2-ethylhexyl) citraconate for 5 min. After mixing the obtained Mg complex was used immediately in the preparation of catalyst component.

19.5 ml titanium tetrachloride was placed in a 300 ml reactor equipped with a mechanical stirrer at 25° C. Mixing speed was adjusted to 170 rpm. 26.0 of Mg-complex prepared above was added within 30 minutes keeping the temperature at 25° C. 3.0 ml of Viscoplex 1-254 and 1.0 ml of a toluene solution with 2 mg Necadd 447 was added. Then 24.0 ml of heptane was added to form an emulsion. Mixing was continued for 30 minutes at 25° C. Then the reactor temperature was raised to 90° C. within 30 minutes. The reaction mixture was stirred for further 30 minutes at 90° C. Afterwards stirring was stopped and the reaction mixture was allowed to settle for 15 minutes at 90° C.

The solid material was washed 5 times: Washings were made at 80° C. under stirring 30 min with 170 rpm. After stirring was stopped the reaction mixture was allowed to settle for 20-30 minutes and followed by siphoning.

Wash 1: Washing was made with a mixture of 100 ml of toluene and 1 ml donor

Wash 2: Washing was made with a mixture of 30 ml of TiCl4 and 1 ml of donor.

Wash 3: Washing was made with 100 ml toluene.

Wash 4: Washing was made with 60 ml of heptane.

Wash 5. Washing was made with 60 ml of heptane under 10 minutes stirring.

Afterwards stirring was stopped and the reaction mixture was allowed to settle for 10 minutes decreasing the temperature to 70° C. with subsequent siphoning, and followed by $N_2$ sparging for 20 minutes to yield an air sensitive powder.

1b) VCH Modification of the Catalyst 35 ml of mineral oil (Paraffinum Liquidum PL68) was added to a 125 ml stainless steel reactor followed by 0.82 g of triethyl aluminium (TEAL) and 0.33 g of dicyclopentyl dimethoxy silane (donor D) under inert conditions at room temperature. After 10 minutes 5.0 g of the catalyst prepared in 1a (Ti content 1.4 wt %) was added and after additionally 20 minutes 5.0 g of vinyl-cyclohexane (VCH) was added). The temperature was increased to 60° C. during 30 minutes and was kept there for 20 hours. Finally, the temperature was decreased to 20° C. and the concentration of unreacted VCH in the oil/catalyst mixture was analysed and was found to be 120 ppm weight.

For polymerisation the catalyst prepared according to the method of example 1a was modified with VCH in the same way as is described in example 1 b, only on a bigger scale. (Ti content of 3.0 wt %). 41 liters of oil, 1.79 kg of TEAL, 0.79 kg of donor D, 5.5 kg of catalyst and 5.55 kg of VCH was used. The concentration of unreacted VCH in the oil/catalyst mixture after the reaction was 150 ppm weight.

All the inventive and comparative example were produced in a Borstar pilot plant with a prepolymerisation reactor, one slurry loop reactor and two gas phase reactors.

The solid catalyst was used in all cases along with triethyl-aluminium (TEAL) as cocatalyst and dicyclo pentyl dimethoxy silane (D-donor) as donor.

The aluminium to donor ratio was 5 mol/mol, the TEAL/Ti-ratio was 90 mol/mol.

Polymerisation conditions are indicated in table 1.

All products were stabilised by melt mixing on a co-rotating twin-screw extruder with 0.2 wt % of Irganox B225 and 0.1 wt % calcium stearate.

CE 1 is HJ120UB, homopolymer, MFR 230/2.16 of 75 g/10 min, Flexural Modulus (determined according to ISO178) of 1500 MPa.

CE2 is HJ325MO, polypropylene homopolymer, MFR 230/2.16 of 50 g/10 min, Flexural Modulus (determined according to ISO178) of 1350 MPa.

CE3 is a non-nucleated, polypropylene homopolymer, MFR 230/2.16 of 59 g/10 min, polymerised in the presence of a catalyst as disclosed according catalyst preparation of step 1a.

CE4 is a nucleated, polypropylene homopolymer, MFR 230/2.16 of 28 g/10 min, polymerised in the presence of a Ziegler-Natta-Catalyst and an internal donor comprising DEHP (di-ethyl-hexyl-phthalate) and 150 ppm Irgaclear XT386 (N-[3,5-bis-(2,2-dimethyl-propionylamino)-phenyl]-2,2-dimethyl-propionamide), CE5 is a nucleated, polypropylene homopolymer, MFR 230/2.16 of 60 g/10 min, polymerised in the presence of a Ziegler-Natta-Catalyst and an internal donor comprising DEHP (di-ethyl-hexyl-phthalate). CE5 was nucleated via Masterbatch technology by incorporating 2 wt % polypropylene-homopolymer comprising polymeric nucleating agent.

Polymer A is a non-nucleated, polypropylene homopolymer, MFR 230/2.16 of 59 g/10 min, polymerised in the presence of a catalyst as disclosed according catalyst preparation of step 1a.

Polymer B is a non-nucleated, polypropylene homopolymer, MFR 230/2.16 of 8 g/10 min, polymerised in the presence of a catalyst as disclosed according catalyst preparation of step 1a.

Polymer C is a nucleated polypropylene homopolymer, MFR 230/2.16 of 63 g/10 min, polymerised in the presence of a catalyst as disclosed according catalyst preparation of step 1a and 1 b.

The resulting polymer powders were compounded in a co-rotating twin-screw extruder Coperion ZSK 57 at 220° C. with the below described stabilisers nucleating agents as indicated.

IE1 was produced by compounding Polymer A with 0.2 wt % Millad 3988 (1,3:2,4-di(4-methylbenzylidene) sorbitol.

IE2 was produced by compounding Polymer B with 150 ppm Irgaclear XT386 (N-[3,5-bis-(2,2-dimethyl-propionylamino)-phenyl]-2,2-dimethyl-propionamide) and Luperox 101 (2,5-di-methyl-2,5 di-(tert-butylperoxy) hexane) for visbreaking the polymer to reach an MFR of 28 g/10 min.

IE3 was produced by compounding Polymer C with 0.2 wt % Millad 3988 (1,3:2,4-di(4-methylbenzylidene) sorbitol.

TABLE 1

Polymerisation data

|  |  | Polymer A | Polymer B | Polymer C |
|---|---|---|---|---|
| Prepolymerisation |  |  |  |  |
| Temperature | ° C. | 25 | 30 | 30 |
| TEAL | g/t C3 | 250 | 170 | 170 |
| Donor | g/t C3 | 20 | 20 | 40 |
| Ethylene feed | kg/h | 0 | 0.33 | 0.3 |
| Residence time | h | 0.33 | 0.37 | 0.38 |
| Donor type | n.a. | D | D | D |
| Loop |  |  |  |  |
| Temperature | ° C. | 70 | 80 | 80 |
| H2/C3 | mol/kmol | 8.8 | 1.2 | 10.8 |
| C2/C3 | mol/kmol | 0.0 | 1.4 | 2.2 |
| Split | wt % | 100 | 59 | 62 |
| Residence time | h | 0.52 | 0.4 | 0.33 |
| MFR2 | g/10 min | 59 | 8 | 66 |
| XCS | wt % | 3.4 | 3.7 | 2.7 |
| GPR |  |  |  |  |
| Temperature | ° C. | not used | 80 | 80 |
| Pressure | kPa |  | 2200 | 2200 |
| Bed level | cm |  | 90 | 109 |
| H2/C3 | mol/kmol |  | 18.6 | 91.3 |
| C2/C3 | mol/kmol |  | 0.3 | 8.0 |
| Residence time | h |  | 1.6 | 2.8 |
| Split | wt % |  | 41 | 38 |
| XCS | wt % |  | 2.4 | 2.4 |
| MFR2 | g/10 min |  | 8.2 | 63 |

TABLE 2

Polymer characteristics:

|  |  | CE1 | CE2 | CE3 | CE4 | IE1 | IE2 |
|---|---|---|---|---|---|---|---|
| Polymer |  | HJ120UB | HJ325MO | Polymer A |  | Polymer A | Polymer B |
| Internal Donor |  |  |  | Citraconate | DEHP | Citraconate | Citraconate |
| Nucleation |  | — | 5000 ppm talcum | — | 150 ppm XT386 | 2000 ppm DMDBS | 150 ppm XT386? |
| MFR230/2.16 |  | 75 | 50 | 59 | 28? | 60 | 28 |
| Hf | J/g | 98 | 100 | 102 | 108 | 102 | 102 |
| Tm | ° C. | 162 | 164 | 164 | 166 | 166 | 164 |
| Tc | ° C. | 116 | 127 | 120 | 127 | 131 | 126 |
| C2 total (NMR) | Wt % |  |  |  |  | 0 | 0 |
| Flexural Modulus | MPa | 1450 | 1720 | 1616 | 1781 | 1903 | 1787 |
| HDT ISO75B | ° C. | 79 | 94 | 92 | 100 | 109 | 108 |
| Haze (1 mm) | % | — | — | — | 48 | 32 | 25 |
| Impact | kJ/m$^2$ | 1.0 | 1.5 | 1.3 | 2.6 | 1.0 | 2.4 |
| Clarity (1 mm) | % |  |  |  | 94 |  | 98 |

Table 2 above clearly shows, that the inventive polypropylene homopolymer achieves better HDT ISO75B values and even reaches the level, that up to now could only be achieved with 0.5 wt % talcum (CE2)

TABLE 3

|  |  | CE5 | IE3 Polymer C+ 2000 ppm DMDBS |
|---|---|---|---|
| C2 total (NMR) | wt % | — | 0.7 |
| Tc | ° C. | 121 | 129 |
| Tm1 | ° C. | 158 | 159 |
| Tm2 | ° C. | 153 | 154 |
| Hm1 | ° C. | 100 | 102.7 |
| Hm2 | ° C. | 0.78 | 1.22 |
| Flexural Modulus | MPa | 1687 | 1746 |
| Charpy ISO179/1eA +23° C. | kJ/m$^2$ | 1.5 | 1.5 |
| Haze (1 mm) | % | 66 | 39 |
| Haze (2 mm) | % | 93 | 69 |
| HDT ISO75B | ° C. | 109 | 118 |
| Cycle time | Sec | 2.6 | 2.2 |
| Cup testing: Top load | N | 350 | 380 |
| Drop height | m | 0.5 | 0.5 |
| Haze on cups | % | 27 | 16 |

Table 3 above clearly shows that the inventive polymer has higher stiffness, better top load, higher Heat distortion Temperature and at the same time better optical properties in the sense of lower haze, both on plaques and cups.

The invention claimed is:

1. Moulded article comprising a polypropylene homopolymer, wherein the polypropylene homopolymer is polymerised in the presence of a Ziegler-Natta catalyst and wherein the polypropylene homopolymer:
   a) comprises 0.40-0.90 wt % of ethylene and/or a C4-C10 α-olefin determined according to $^{13}$C-NMR,
   b) comprises at least one α-nucleating agent,
   c) is free of phthalic acid esters as well as their respective decomposition products,
   d) has a MFR230/2.16 determined according to ISO1133 in the range of 20-200 g/10 min, and
   e) has a haze of ≤42% (ASTM 1003-D) when measured on 1 mm plaques,
   wherein the Ziegler-Natta catalyst is self-supported by being free of any external support material and comprises:
   a) compounds of a transition metal of Group 4 to 6 of IUPAC,
   b) a Group 2 metal compound,
   c) an internal donor, wherein said internal donor is a citraconate,
   d) a co-catalyst, and
   e) optionally, an external donor.

2. Moulded article according to claim 1, wherein the at least one α-nucleating agent is either a polymeric nucleating agent and/or a soluble nucleating agent selected from sorbitol derivatives, nonitol derivatives, and benzene-trisamides.

3. Moulded article according to claim 1, wherein the polypropylene homopolymer:
   has a Heat Distortion Temperature (ISO 75B) of at least 90° C.

4. Moulded article according to claim 1, wherein the polypropylene homopolymer:
   has a haze of ≤35% when measured on 1 mm plaques.

5. Moulded article according to claim 1, wherein the polypropylene homopolymer:
   has top load of 360 N or more.

6. Moulded article according to claim 1, wherein the moulded article is an injection moulded article.

7. Moulded article according to claim 1, wherein the moulded article has a wall thickness of 2 mm or below.

8. Moulded article according to claim 1, wherein the moulded article is a container.

* * * * *